United States Patent [19]

Stone, Jr.

[11] 3,736,638
[45] June 5, 1973

[54] METHOD FOR BONDING OPPOSED PARTS OF A HOLLOW ARTICLE TOGETHER

[75] Inventor: Hilton F. Stone, Jr., Glastonbury, Conn.

[73] Assignee: United Aircraft Corporation, East Hartford, Conn.

[22] Filed: Apr. 7, 1971

[21] Appl. No.: 131,966

[52] U.S. Cl. ............... 29/156.8, 29/493, 29/497.5, 156/292, 156/323, 228/44
[51] Int. Cl. ...... B21k 3/04, B23p 15/02, B23p 15/04
[58] Field of Search ............... 29/156.8 H, 156.8 B, 29/493, 497.5, DIG. 20; 269/75; 156/292, 323; 228/44

[56] References Cited

UNITED STATES PATENTS

| | | | |
|---|---|---|---|
| 2,166,998 | 7/1939 | Morgan | 29/493 |
| 2,326,430 | 8/1943 | Blanchard | 29/493 X |
| 2,457,202 | 12/1948 | Brody | 29/493 X |
| 3,449,820 | 6/1969 | Jones et al. | 29/497.5 X |
| 3,628,226 | 12/1971 | Nelson | 29/156.8 H |

Primary Examiner—J. Spencer Overholser
Assistant Examiner—Ronald J. Shore
Attorney—Charles A. Warren

[57] ABSTRACT

Apparatus for and method of bonding together the parts of a two part hollow article having projecting ribs on at least one part engaging cooperating surfaces on the other part and in which a high pressure is applied during the bonding operation to the portions of the parts that are in contact with one another without a corresponding pressure on the remainder of the surfaces of the article.

4 Claims, 5 Drawing Figures

PATENTED JUN 5 1973          3,736,638

INVENTOR
HILTON F. STONE, JR.

BY Charles A. Warren
ATTORNEY

METHOD FOR BONDING OPPOSED PARTS OF A HOLLOW ARTICLE TOGETHER

The present invention relates to an apparatus and method of holding together the mating parts of a hollow article such as a compressor or turbine blade or vane with the high pressure concentrated on the contacting areas during the bonding operation.

BACKGROUND OF THE INVENTION

In applying a uniform pressure over the entire area of the mating parts of the article during bonding, if this pressure is high enough to hold the contacting surfaces in adequate contact for bonding operation, this same pressure on the hollow parts of the article tends to distort the surfaces of the parts as by dishing in the surfaces so that the finished article does not have the desired external contour. This has been overcome by filling the hollow spaces prior to bonding with a solid that is leached out subsequent to the bonding operation, but such filling and subsequent leaching is time consuming and materially increases the cost of the finished article.

SUMMARY OF THE INVENTION

The principal feature of the invention is an arrangement by which to apply a concentrated pressure over the areas of the opposed parts of the article that are in contact with one another and where the bonding is to occur with a minimum of pressure over the remainder of the parts overlying the hollow areas. Another feature is a method of accomplishing this result.

According to the present invention, each of the opposed parts of the hollow article is formed with spaced surfaces to contact with similar surfaces on the other part and the cooperating parts are assembled on a die which has a surface thereon to support one of said parts. A pressure member is then applied to the other part which member has a reduced thickness coincident in location with the arrangement of the contacting surfaces on the inside wall of said other part and a fluid pressure is applied to this pressure member. The effect is that a high pressure acts on the areas of the part coinciding with the reduced thickness and the full thickness portions of the pressure member bridge the hollow portions and assist in applying a higher pressure to the portions of the part where bonding is to occur.

DESCRIPTION OF THE PREFERRED EMBODIMENT

Figure 1:
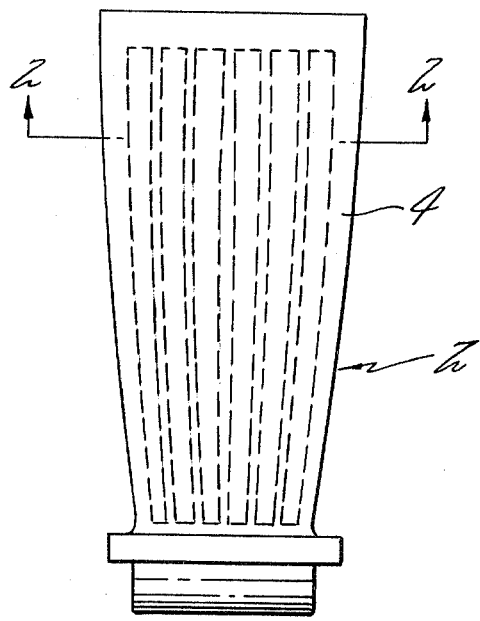
FIG. 1 is an elevation of a part made by the apparatus and method of the invention.
Figure 2:
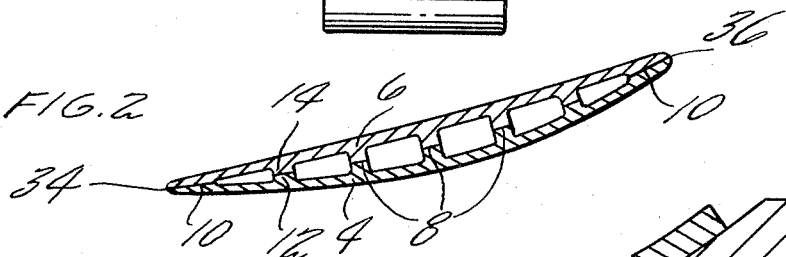
FIG. 2 is a sectional view along the line 2—2 of FIG. 1.

Referring first to FIG. 1, the article made by the apparatus and method to be described is a hollow compressor or turbine blade 2 made up of two opposed mating parts or sides 4 and 6, FIG. 2. Each of these mating parts has a plurality of spaced contacting surfaces 8 and 10. The surfaces 8 are on the outer ends of several substantially parallel ribs 12 and 14 on the inner surfaces of the parts 4 and 6 respectively, and the surfaces 10 are along the peripheries of the two parts as shown in FIG. 1 and on the part 4 in FIG. 4.

Figure 3:
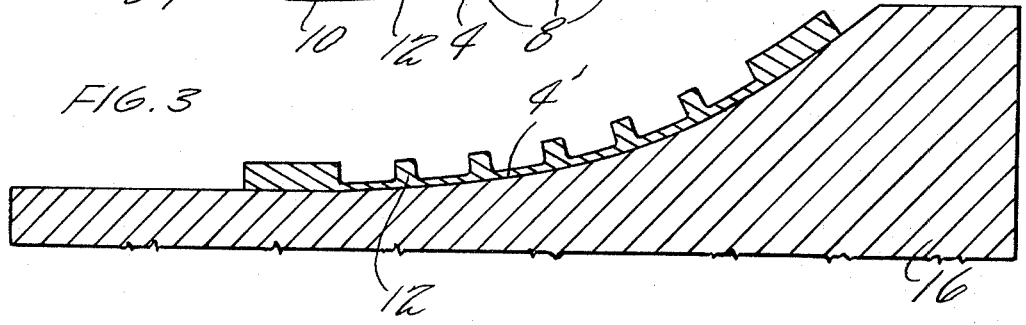
FIG. 3 shows an early step in the method.
Figure 4:
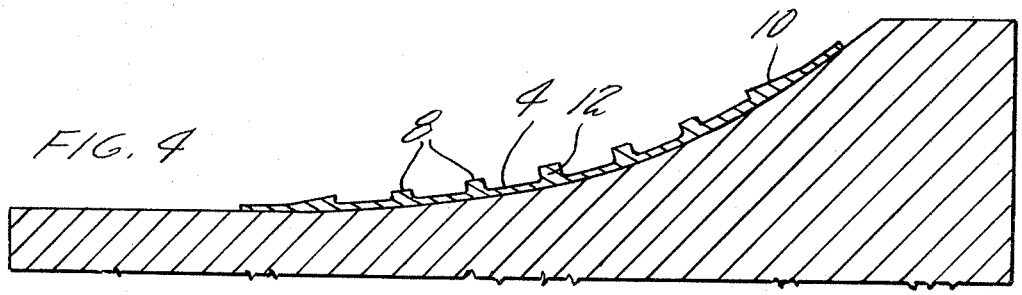
FIG. 4 shows a further step in the method.

In making this blade each of the opposed parts is formed with an excess of material on the ribs 12 and 14 and in the areas of the surfaces 10 as shown in FIG. 3 which figure shows the unfinished part 4' at this stage of the operation. The unfinished part in this configuration may be produced by casting or other means such as forging or a pressing operation depending on the material of the part. The part is positioned on a supporting die 16 conforming to the finished shape of the outer surface of this part and the excess of material is then milled off to the exact dimension of this part and to the exact configuration of this part in the finished product as shown in FIG. 4.

Figure 5:
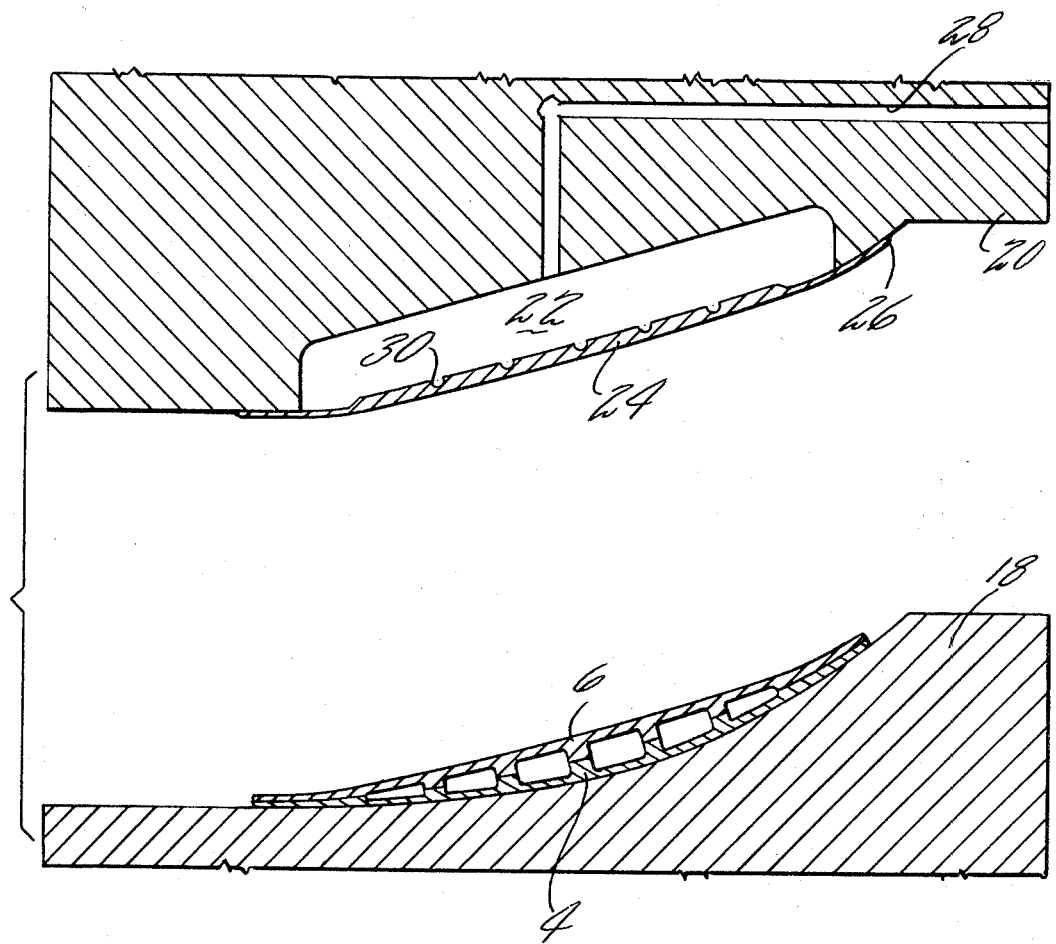
FIG. 5 shows the apparatus of the invention for completing the method.

With the opposed parts of the article both finished in this manner, they are placed together in readiness for the bonding operation as shown in FIG. 5 and the part 4 is placed on the fixed die 18 of a pair of bonding dies 18 and 20. The die 18 has an area thereon contoured to the exact dimension and shape of the finished part 4 on which this part is securely supported. The movable die 20 has a cavity 22 therein corresponding in shape and dimension to the area of the mating part 6 and this cavity is closed by a pressure member 24, the periphery of which overlies the edges of the cavity 22 and is welded to the surface of the die as shown at 26. The pressure member conforms in shape to the configuration of the mating part 6. Suitable means are provided for filling the cavity with fluid under pressure, such as argon or other inert gas as by a passage 28 in the die 20.

The pressure member 24 which is a relatively rigid material is thick enough to resist significant deflection by the pressure applied thereto. In the arrangement shown, this member is metallic to withstand the pressure and temperature of the bonding operation. To localize the pressure over the areas where the mating surfaces of blade parts are in contact and are to be bonded together, the pressure member is made relatively thin in areas overlying the pattern of the cooperating surfaces 8 as by the formation of grooves 30 therein and is also thinned where the pressure member overlies the peripheral surfaces 10 as at 32.

The grooves 30 are narrower in width than the ribs 12 and 14 and thus narrower than the contacting surfaces 8 on the part and the thinned periphery is less wide than the surfaces 10. In this way the thicker portions between the grooves therein bridge over the hollow portions of the cooperating blade parts and cause a higher pressure to be exerted on the cooperating surfaces 8 and a significantly lower pressure over the hollow portions of the blade. The effect of the relatively rigid backing member overlying the hollow surfaces of the blade parts prevents distortion of the hollow parts of the blade by the pressure in cavity 22, but does assure the necessary high pressure acting on the contacting surfaces during the bonding operation. Obviously, the dies and the blade being bonded are heated while the dies are held together and pressure is applied to cavity 22 to provide the necessary bonding action. For example, if the blade elements are a titanium, the pressures may be 500 psi and the bonding temperatures 1650°F.

It will be understood that the dies 20 and 22 are suitably mounted in a press having a head on which the die 22 is mounted for movement toward and away from die 20 in loading and unloading the dies, and in applying the necessary pressure to hold the dies in position during the bonding. Such presses are well known and need no further description. The particular arrangement of the pressure member in the described apparatus permits successful operation even if there is a small leakage from the cavity 22 as the leakage fluid will escape around the dies and will not enter the cavities within the blade.

After completion of the bonding operation and removal of the blade from the dies, the leading and trailing edges 34 and 36 of the blade are machined to the desired contour as shown in FIG. 2 and the blade is completed.

What is claimed is:

1. In the bonding together of opposed parts of a hollow article, each of the opposed parts having a plurality of cooperating surfaces spaced from one another to contact similar surfaces on the other part and to be bonded thereto, the steps of:
   1. forming each of the parts to the finished configuration on its inner surface,
   2. placing said opposed parts together in proper assembled relation,
   3. supporting one of said parts by a die having a surface conforming in shape and dimension to said part,
   4. applying a backing member to the other part, said backing member having grooves coinciding in configuration to the underlying contacting surfaces on the part,
   5. applying fluid pressure to the side of the backing member opposite to the part such that a higher pressure is exerted on said other part in the areas opposite to the cooperating surfaces than on the remainder of the part, and
   6. bonding said parts together while said pressure is exerted.

2. The method of claim 1 in which the backing member is of a substantial uniform thickness except for the grooves.

3. The method of claim 1 with the added step of applying a uniform fluid pressure to the surface of the backing member.

4. The method of claim 1 in which the hollow article is a compressor or turbine blade with the added steps of:
   conforming said die and said backing member in shape to the opposite surfaces of the blade and,
   forming said contacting surfaces on ribs on at least one of the halves of the blade.

* * * * *